(12) United States Patent
Arimilli et al.

(10) Patent No.: US 9,110,885 B2
(45) Date of Patent: *Aug. 18, 2015

(54) TECHNIQUES FOR CACHE INJECTION IN A PROCESSOR SYSTEM

(75) Inventors: Lakshminarayana B. Arimilli, Austin, TX (US); Ravi K. Arimilli, Austin, TX (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 853 days.

This patent is subject to a terminal disclaimer.

(21) Appl. No.: 12/212,917

(22) Filed: Sep. 18, 2008

(65) Prior Publication Data

US 2010/0070710 A1    Mar. 18, 2010

(51) Int. Cl.
*G06F 12/00* (2006.01)
*G06F 13/28* (2006.01)
*G06F 12/08* (2006.01)

(52) U.S. Cl.
CPC ............ *G06F 13/28* (2013.01); *G06F 12/0835* (2013.01); *G06F 2212/507* (2013.01); *G06F 2212/621* (2013.01)

(58) Field of Classification Search
None
See application file for complete search history.

(56) References Cited

U.S. PATENT DOCUMENTS

| 4,920,478 | A | 4/1990 | Furuya et al. |
| 5,325,504 | A | 6/1994 | Tipley et al. |
| 6,587,926 | B2 | 7/2003 | Arimilli et al. |
| 6,629,210 | B1 | 9/2003 | Arimilli et al. |
| 6,711,650 | B1 | 3/2004 | Bohrer et al. |
| 6,851,024 | B1 | 2/2005 | Wilkes et al. |
| 6,920,514 | B2 | 7/2005 | Arimilli et al. |
| 7,213,248 | B2 | 5/2007 | Arimilli et al. |
| 2004/0139305 | A1 | 7/2004 | Arimilli et al. |
| 2006/0015618 | A1 | 1/2006 | Freimuth et al. |
| 2006/0015651 | A1 | 1/2006 | Freimuth et al. |
| 2006/0031524 | A1 | 2/2006 | Freimuth et al. |
| 2006/0036811 | A1 | 2/2006 | Dieffenderfer et al. |
| 2006/0064518 | A1 | 3/2006 | Bohrer et al. |
| 2006/0143400 | A1 | 6/2006 | Steely, Jr. |
| 2007/0150659 | A1 * | 6/2007 | Arimilli et al. ............... 711/137 |
| 2008/0077743 | A1 | 3/2008 | Laudon |
| 2009/0037927 | A1 | 2/2009 | Sangili et al. |

FOREIGN PATENT DOCUMENTS

EP    0203601    8/1992

OTHER PUBLICATIONS

U.S. Appl. No. 12/212,935 "Techniques for Cache Injection in a Processor System Responsive to a Specific Instruction Sequence", filed Sep. 18, 2008, Lakshminarayana Arimilli et al.
U.S. Appl. No. 12/212,961 "Techniques for Cache Injection in a Processor System Using a Cache Injection Instruction", filed Sep. 18, 2008, Lakshminarayana Arimilli et al.

(Continued)

*Primary Examiner* — Midys Rojas
(74) *Attorney, Agent, or Firm* — Russell Ng PLLC; William Stock

(57) ABSTRACT

A technique for performing cache injection includes monitoring addresses on a bus. Ownership of input/output data on the bus is acquired by a cache when an address on the bus (that is associated with the input/output data) corresponds to an address of a data block stored in the cache.

20 Claims, 8 Drawing Sheets

(56) References Cited

OTHER PUBLICATIONS

U.S. Appl. No. 12/212,977 "Techniques for Cache Injection in a Processor System with Replacement Policy Position Modification", filed Sep. 18, 2008, Lakshminarayana Arimilli et al.

Rojas, Midys, Nonfinal Office Action dated Feb. 2, 2011, U.S. Appl. No. 12/212,935.

Chrzanowski, M., Nonfinal Office Action dated Mar. 29, 2011, U.S. Appl. No. 12/212,961.

Chrzanowski, M., Nonfinal Office Action dated Mar. 29, 2011, U.S. Appl. No. 12/212,977.

* cited by examiner

TECHNIQUES FOR CACHE INJECTION IN A PROCESSOR SYSTEM

This invention was made with United States Government support under Agreement No. HR0011-07-9-0002 awarded by DARPA. The Government has certain rights in the invention.

CROSS-REFERENCE TO RELATED APPLICATIONS

The present application is related to the following commonly assigned patent applications: U.S. patent application Ser. No. 12/212,935, entitled "TECHNIQUES FOR CACHE INJECTION IN A PROCESSOR SYSTEM USING A CACHE INJECTION INSTRUCTION" by Ravi K. Arimilli et al.; U.S. patent application Ser. No. 12/212,961, entitled "TECHNIQUES FOR CACHE INJECTION IN A PROCESSOR SYSTEM RESPONSIVE TO A SPECIFIC INSTRUCTION SEQUENCE" by Ravi K. Arimilli et al.; and U.S. patent application Ser. No. 12/212,977, entitled "TECHNIQUES FOR CACHE INJECTION IN A PROCESSOR SYSTEM WITH REPLACEMENT POLICY POSITION MODIFICATION" by Ravi K. Arimilli et al., all of which were filed on even date herewith and are incorporated herein by reference in their entirety for all purposes.

BACKGROUND

1. Field

This disclosure relates generally to a processor system and, more specifically to techniques for cache injection in a processor system.

2. Related Art

Disparity between processor and memory speeds (also referred to as "the memory wall") may adversely affect application performance. For example, applications that perform scientific and vector computation, encryption, signal processing, string processing, image processing, and deoxyribonucleic acid (DNA) sequence matching may be adversely affected by the memory wall. A number of different techniques (e.g., data caching, prefetching, software access ordering, and hardware-assisted access ordering) have been employed in an attempt to improve application performance. While the afore-mentioned techniques have generally proven effective for a variety of workloads, memory latency and memory traffic delays may still be encountered when accessing input/output (I/O) data (e.g., network messages).

To reduce delays associated with accessing I/O data, a number of cache injection policies have been proposed. In general, cache injection policies move I/O data into a cache before the I/O data is accessed in an attempt to minimize cache-miss latency. Information on which a cache injection policy is based may reside in various locations. For example, cache injection policy information may reside at a network interface controller (NIC), an I/O bridge, or at a cache. As one example, a NIC with access to operating system (OS) scheduling information may select a cache in which to inject I/O data based on which processor is scheduled to execute a thread that will consume the I/O data. As another example, a cache may include hardware support for storage of a list of addresses an application is expected to utilize in a selected number of subsequent processor cycles. The cache may then snoop addresses associated with data on a bus and store the data in the cache when the address on the bus is present in the list of addresses.

SUMMARY

According to one aspect of the present disclosure, a technique for performing cache injection includes monitoring addresses on a bus at a cache. Ownership of input/output data on the bus is acquired by the cache when an address on the bus (that is associated with the input/output data) corresponds to an address of a data block stored in the cache.

According to another aspect of the present disclosure, a technique for performing cache injection includes monitoring addresses on a bus at first and second caches. Ownership of input/output data on the bus is then acquired, based on an implemented priority scheme, at the first cache or the second cache when an address on the bus (that is associated with the input/output data) corresponds to an address of respective data blocks stored in the first and second caches.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

Figure 1:
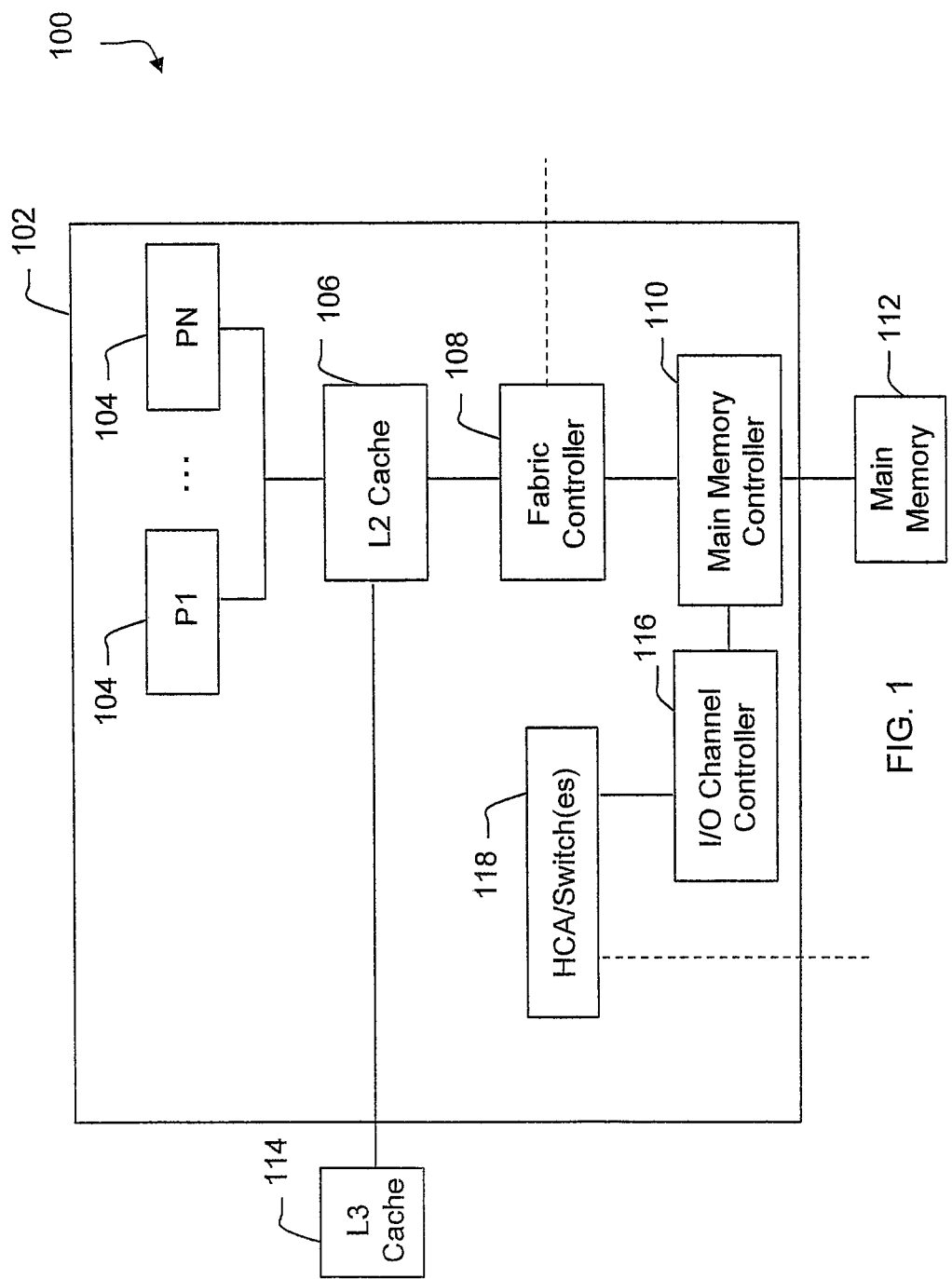
FIG. 1 is a diagram of an example processor system that may be configured to employ cache injection according to various aspects of the present disclosure.

As will be appreciated by one of ordinary skill in the art, the present invention may be embodied as a method, system, device, or computer program product. Accordingly, the present invention may take the form of an entirely hardware embodiment, an entirely software embodiment (including firmware, resident software, microcode, etc.) or an embodiment combining software and hardware aspects that may all generally be referred to herein as a circuit, module, or system. The present invention may, for example, take the form of a computer program product on a computer-usable storage medium having computer-usable program code, e.g., in the form of one or more design files, embodied in the medium.

Any suitable computer-usable or computer-readable storage medium may be utilized. The computer-usable or computer-readable storage medium may be, for example, but is not limited to, an electronic, magnetic, optical, electromagnetic, infrared, or semiconductor system, apparatus, or device. More specific examples (a non-exhaustive list) of the computer-readable storage medium includes the following: a portable computer diskette, a hard disk, a random access memory (RAM), a read-only memory (ROM), an erasable programmable read-only memory (EPROM) or flash memory, a portable compact disc read-only memory (CD-ROM), an optical storage device, or a magnetic storage device. As used herein the term "coupled" includes a direct electrical connection between elements or blocks and an indirect electrical connection between elements or blocks achieved using one or more intervening elements or blocks.

According to various aspects of the present disclosure, a direct memory access (DMA) write (e.g., by an input/output (I/O) peripheral such as a network interface controller (NIC)) to an address in main memory is intercepted and I/O data associated with the DMA write is stored in a cache that previously included a data block associated with the address. In general, storing the I/O data in the cache (instead of the main memory) reduces memory latency associated with accessing the I/O data (assuming the I/O data is consumed prior to being evicted from the cache).

According to one or more aspects of the present disclosure, instruction set architecture (ISA) support for cache injection is achieved through implementing a cache injection instruction (e.g., an enhanced data cache block touch (DCBT) instruction in a PowerPC™ architecture). In general, programs are written using effective addresses (EAs), while caches and main memory are accessed utilizing real addresses (RAs). As such, address translation is required to convert the EAs (used by software) to RAs (used by hardware). For example, in various PowerPC™ architectures a segment table (located in a segment lookaside buffer (SLB)) and hashed page table (located in a translation lookaside buffer (TLB)) have been employed to translate EAs (used by software) into RAs (used by hardware) to locate data in storage. After translation, an EA and RA pair may be stored in an effective-to-real address translation (ERAT) buffer to reduce latency associated with accessing data in storage. In general, an ERAT table (stored in the ERAT buffer) may be accessed (indexed) using an EA. It should be appreciated that the techniques disclosed herein are equally applicable to architectures that convert an EA to an RA without first converting the EA to a virtual address (VA).

With reference to FIG. 1, a relevant portion of an example processor system 100 is illustrated that may employ cache injection according to one or more of the techniques disclosed herein. The example processor system 100 includes one or more chip-level multiprocessors (CMPs) 102 (only one of which is illustrated in FIG. 1), each of which may include multiple (e.g., two to one-hundred processor cores) processors 104. The CMP 102 may correspond to, for example, a processor node of a computer cluster employed in a high performance computing (HPC) application. The processors 104 may, for example, operate in a simultaneous multithreading (SMT) mode or a single thread (ST) mode. When the processors 104 operate in the SMT mode, the processors 104 may employ multiple separate instruction fetch address registers to store program counters for multiple threads. In at least one embodiment, the processors 104 each include a first level (L1) cache memory (not separately shown in FIG. 1, see FIG. 2) that is coupled to a shared second level (L2) cache memory (cache) 106, which is coupled to a shared third level (L3) cache 114 and a fabric controller 108.

As is illustrated, the fabric controller 108 is coupled to a memory controller (e.g., included in a Northbridge) 110, which is coupled to a memory subsystem 112. In alternative embodiments, the fabric controller 108 may be omitted and, in this case, the L2 cache 106 may be directly connected to the main memory controller 110. The memory subsystem 112 includes an application appropriate amount of volatile and non-volatile memory. The fabric controller 108, when implemented, facilitates communication between different CMPs and between the processors 104 and the memory subsystem 112 and, in this manner, functions as an interface. It should be appreciated that the various techniques disclosed herein are equally applicable to systems that employ separate L2 caches for each processor, as well as systems that employ separate L2 and L3 caches for each processor. Each of the L1, L2, and L3 caches may be combined instruction and data caches or data caches.

Figure 2:
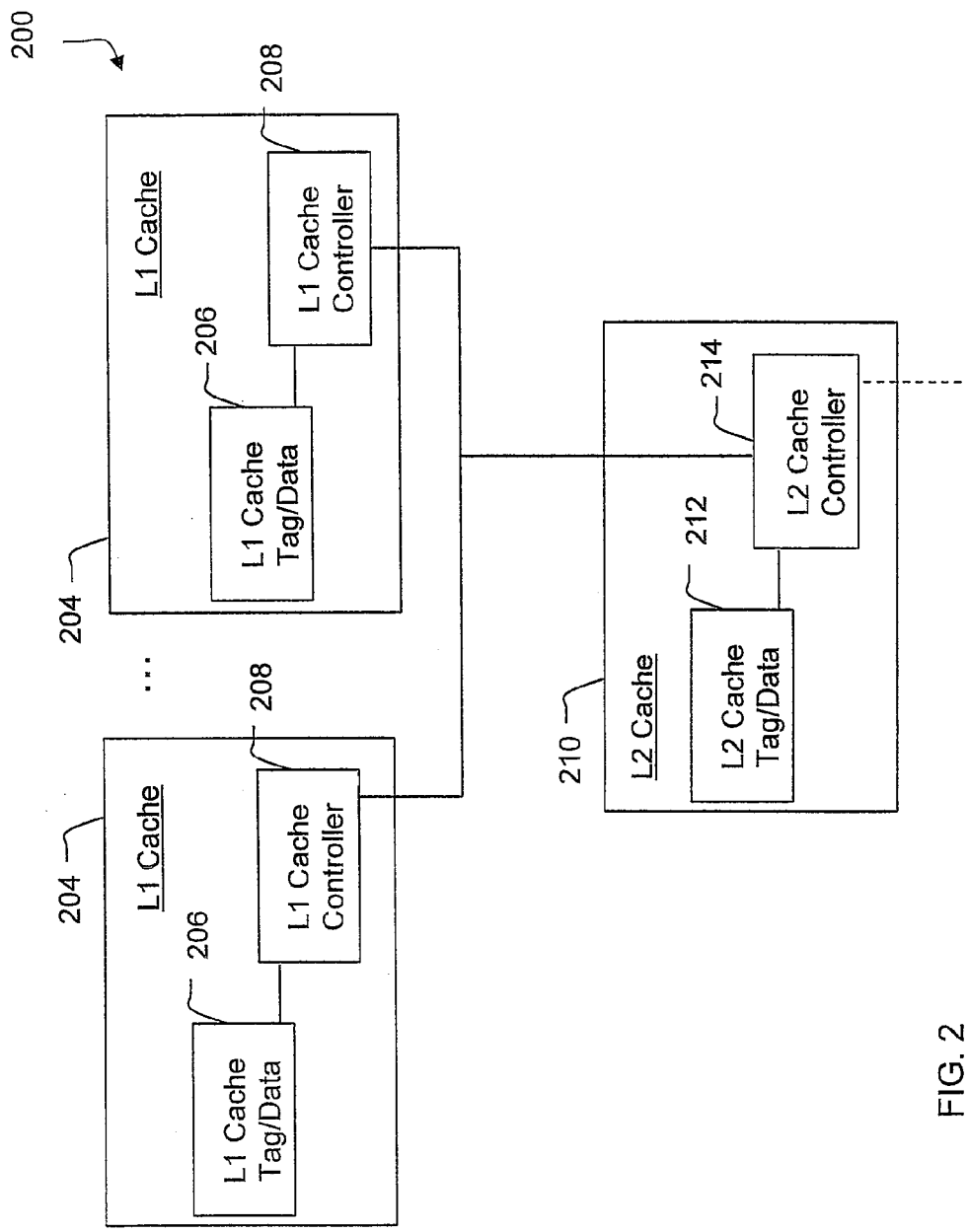
FIG. 2 is a diagram of a relevant portion of an example cache subsystem that may be employed in the processor system of FIG. 1, according to various embodiments of the present disclosure.

As is shown in FIG. 1, the main memory controller 110 is also coupled to an I/O channel controller (e.g., included in a Southbridge) 116, which is coupled to a host channel adapter (HCA)/switch block 118. The HCA/switch block includes an HCA and one or more switches that may be utilized to couple the processors 104 of the CMP 102 to other nodes (e.g., I/O subsystem nodes and other processor nodes) of a computer cluster. With reference to FIG. 2, a relevant portion of an example cache system 200 is illustrated. The cache system 200 includes multiple (one for each processor core) L1 caches 204, each of which includes an L1 cache controller 208, which is coupled to an L1 cache tag/data array 206. In various embodiments, the tag for each entry of the L1 cache data array has associated therewith a number of coherency status bits (included in a coherency status field) for tracking a coherency state of each data block (e.g., cache line) and replacement policy bits (included in a replacement policy field, such as a least recently used (LRU) field), among other bits. For example, the coherency status field for each entry may include a modified (M) bit, an exclusive (E) bit, a shared (S) bit, an invalid (I) bit, and a grab (G) bit, among other bits.

As is illustrated, the system 200 includes an L2 cache 210 that is shared by the L1 caches 204. As is also illustrated the L2 cache 210 includes an L2 cache controller 214, which is coupled to an L2 cache tag/data array 212 and the L1 cache controllers 208. In addition to storing an address, the tag for each entry of the L2 cache data array also has associated therewith a number of coherency status bits (included in a coherency status field) for tracking a coherency state of each data block. As above, the coherency status field for each entry may also include a modified (M) bit, an exclusive (E) bit, a shared (S) bit, an invalid (I) bit, and a grab (G) bit, among other bits. As is discussed in further detail herein, the grab bit, when asserted, indicates that an associated data block (e.g., cache line) of a cache does not currently include data of interest. That is, when an address associated with the data block is later detected on a memory bus, the data of interest (i.e., I/O data associated with the address) should be grabbed by an associated cache controller and stored in the data block of the cache.

According to various aspects of the present disclosure, a cache injection instruction (e.g., an enhanced DCBT instruction) is provided that indicates cache injection is to be employed to provide I/O data to a data block of a cache at an associated address. When an enhanced DCBT instruction is employed, the enhanced DCBT instruction can be configured to include a field (including one or more bits) that indicates that the instruction is associated with a cache injection operation. Alternatively, an opcode or extended opcode may be employed to indicate that an instruction is a cache injection instruction. In one or more embodiments, a cache controller is configured to modify a bit in a coherency status field (i.e., a grab coherency state bit of the coherency status field included in a cache directory) associated with a data block to indicate that the data block is to be updated with I/O data when a DMA write to an address associated with the data block is encountered. In this manner, the latency associated with writing the I/O data to main memory and reading the I/O data from the main memory to a cache may be avoided.

Figure 3:
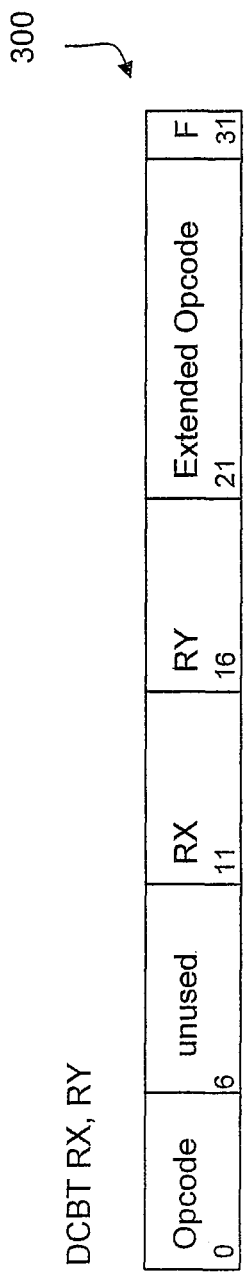
FIG. 3 is an example diagram of a cache injection instruction configured according to one aspect of the present disclosure.

With reference to FIG. 3, when an enhanced data cache block touch instruction (DCBT RX, RY) 300 is executed, a load store unit (LSU) determines whether a grab coherency state field (F) is asserted. If the grab coherency state is indicated, a cache (e.g., a level 1 (L1) cache, a level 2 (L2) cache, or level 3 (L3) cache) that includes a data block at an RA (which is determined by adding content of register 'X' and register 'Y' (i.e., EA=RX+RY) and translating the EA to the RA) initiates modification of a directory of the cache to indicate that a data block at the RA is not the data of interest but that the data of interest corresponds to I/O data associated with a DMA write to the RA. In the above example, RX, and RY are register file addresses (e.g., in various PowerPC™ implementations, RX, and RY can range from 0 to 31, but in other processors the range can be higher or lower). Instead of providing the registers RX and RY to calculate the EA, the EA may be provided in various other manners (e.g., directly through an absolute addressing mechanism or through indexing).

According to one aspect of the present disclosure, a processor whose associated cache includes a data block at an address associated with a direct memory access (DMA) write is configured to assume ownership of input/output (I/O) data associated with the DMA write. In this case, a cache controller associated with the processor stores the I/O data in the associated cache for later use by the processor or an associated processor (e.g., another processor within a same processor node may snarf the I/O data) and notifies an I/O channel controller and a main memory controller that the I/O data was received (effectively truncating the DMA write to main memory).

Figure 4:
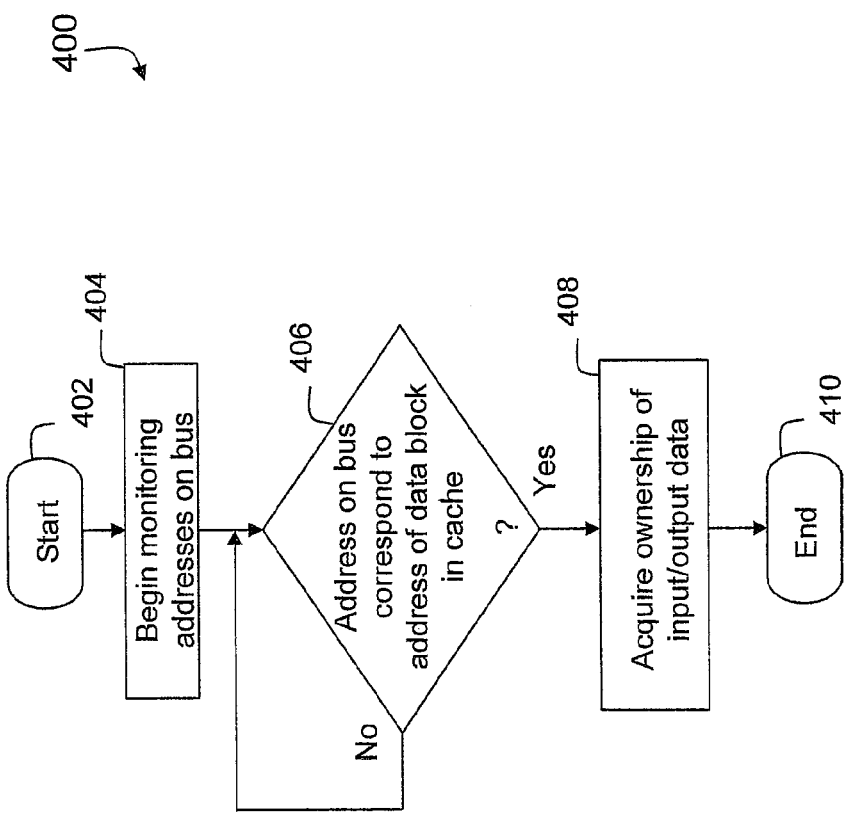
FIG. 4 is a flowchart of an example process for performing cache injection, according to one aspect of the present disclosure.

With reference to FIG. 4, a flowchart of an example process 400 for performing cache injection according to an embodiment of the present disclosure is illustrated. In block 402 the process 400 is initiated, at which point control transfers to block 404. In block 404, a cache controller (e.g., an L1 cache controller) begins monitoring (snooping) addresses on a bus (e.g., a memory bus including multiple address, data, and control lines). Next, in decision block 406, the cache controller determines whether an address on the bus corresponds to an address of a data block (e.g., cache line) that is in a grab coherency state ('g' state). That is, the cache controller determines whether an associated cache directory includes a 'g' state data block (e.g., cache line) whose address corresponds to the address on the bus (i.e., whether a cache-hit occurs). The address on the bus may, for example, correspond to an address for a DMA write to main memory. If an address on the bus does not correspond to a 'g' state address in the cache, control loops on block 406. If an address on the bus corresponds to a 'g' state address in the cache, control transfers to block 408.

In block 408, the cache controller acquires ownership of the I/O data. In acquiring ownership of the I/O data, the cache controller causes the I/O data to be stored in a data block of the cache that is associated with the address. In a typical implementation, the cache controller also exercises one or more control lines to acknowledge receipt of the I/O data and indicate to a main memory controller that storage of the I/O data in the main memory is not required (effectively stopping the DMA write to main memory) and to indicate to an I/O channel controller that the I/O data was received. Following block 408, control transfers to block 410 where the process 400 terminates. While the various cache injection descriptions herein are directed to an L1 cache, it should be appreciated that the techniques disclosed herein are equally applicable to any cache level (e.g., a second level (L2) cache, a third level (L3) cache, etc.) where distinct caches are maintained for each processor.

According to another aspect of the present disclosure, when multiple caches (associated with different processors) include a data block (e.g., cache line) at an address associated with a DMA write, one of the different processors assumes ownership of I/O data associated with the DMA based on an implemented priority scheme. For example, the priority scheme may be based on which cache having the data block at the address last entered a 'g' state or an age of a data block at the address. As one example, in a processor system (including a first processor and a second processor) that includes a data block at the address in two respective caches, a cache controller of the processor is configured to store the I/O data in the data block that is scheduled to be ejected later in time. For example, if the data block is at a least recently used (LRU) position in an L1 cache associated with the first processor and a LRU-5 position in an L1 cache associated with the second processor, the L1 cache associated with the second processor (which has a higher replacement policy position) is selected to store the I/O data. The L1 cache associated with the second processor may then provide the I/O data to the second processor or another processor, as needed.

Figure 5:
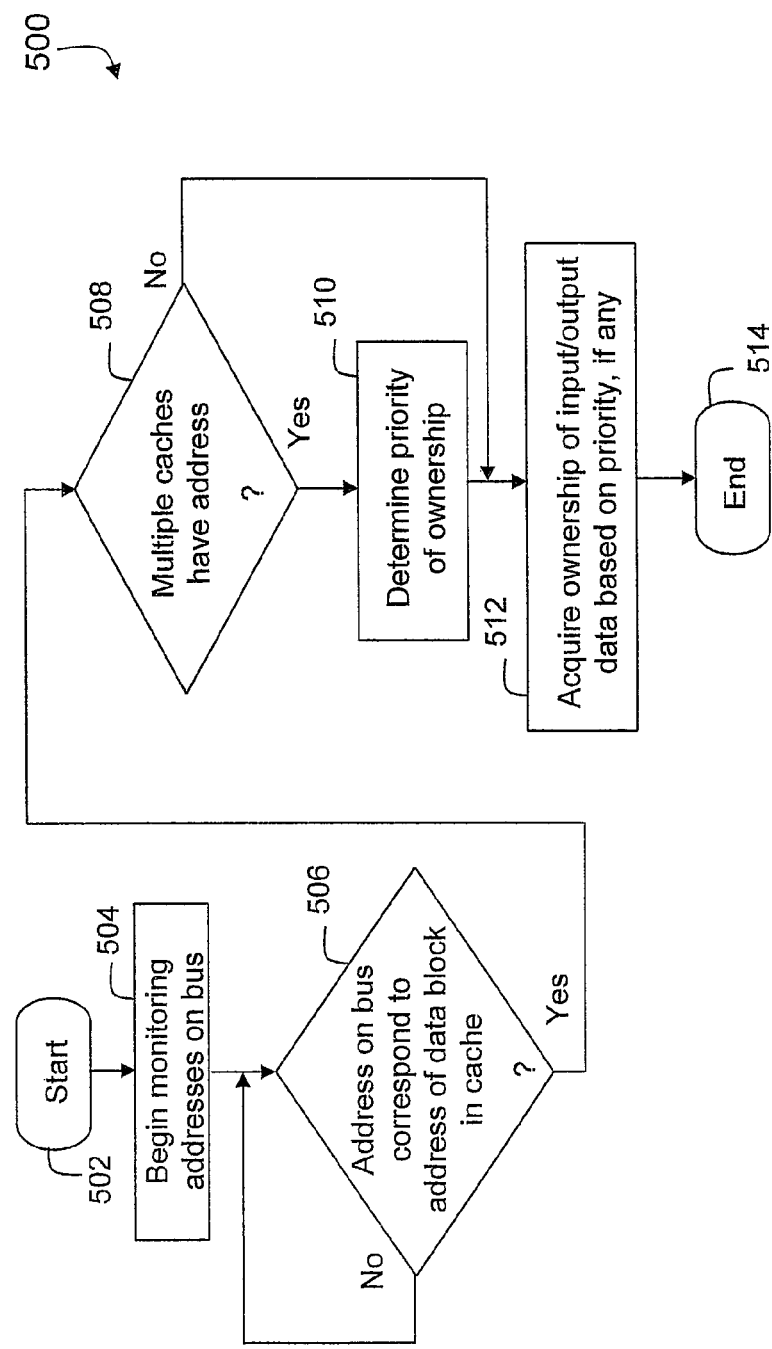
FIG. 5 is a flowchart of an example process for performing cache injection, according to another aspect of the present disclosure.

With reference to FIG. 5, a flowchart of an example process 500 for performing cache injection according to another embodiment of the present disclosure is illustrated. In block 502 the process 500 is initiated, at which point control transfers to block 504. In block 504, multiple cache controllers (e.g., L1 cache controllers) that have a data block (e.g., cache line) in a 'g' state begin monitoring (snooping) addresses on a bus. Next, in decision block 506, each of the cache controllers determine whether an address on the bus corresponds to an address of a data block that is in a grab coherency state ('g' state). That is, the cache controllers determine whether an associated cache directory includes a 'g' state data block whose address corresponds to the address on the bus (i.e., whether a cache-hit occurs). The address on the bus may, for example, correspond to an address for a DMA write to main memory. If an address on the bus does not correspond to a 'g' state address in the cache, control loops on block 506. If an address on the bus corresponds to a 'g' state address in at least one of the caches, control transfers to decision block 508.

In block 508, it is determined whether multiple caches have a data block at the address on the bus (i.e., whether multiple cache controllers are attempting to acquire I/O data). If multiple of cache controllers are not attempting to acquire ownership of the I/O data, control transfers to block 512. If multiple of the cache controllers are attempting to acquire ownership of the I/O data, control transfers to block 510. In block 510, priority of ownership is determined based on an implemented priority scheme. For example, a cache that includes the address at a higher replacement policy position may be designated to acquire the I/O data. Alternatively, when a cache controller takes a data block to a 'g' state, a cache controller for another cache that includes a data block at a same address may invalidate the data block and clear its 'g' state. Next, in block 512, a designated cache acquires ownership of the I/O data, and an associated cache controller causes the I/O data to be stored in a data block of the cache that is associated with the address. As noted above, in a typical implementation, the cache controller also exercises one or more control lines to acknowledge receipt of the I/O data and indicate to a main memory controller that storage of the I/O data in the main memory is not required (effectively stopping the DMA write to main memory). Following block 512, control transfers to block 514 where the process 500 terminates.

According to another embodiment of the present disclosure, instruction set architecture support (ISA) is implemented to facilitate a grab coherency state. For example, in a PowerPC™ architecture a data cache block touch (DCBT) instruction may be enhanced to include a field that indicates that a valid data block is not included at an associated address in a cache (i.e., to put the data block associated with the address in a grab coherency state ('g' state)). In this case, cache injection is employed to store a data block (including I/O data) at the address in the cache (instead of main memory) when a DMA write associated with the address is encountered. Alternatively, one or more specific cache injection instructions may be employed. Cache injection instructions (which may be added to software by a programmer) are generally treated as hints, which affect software performance but not software functionality. In this case, a hint (associated with a cache injection instruction) is used to move I/O data into a desired cache in an attempt to provide a desired performance.

Figure 6:
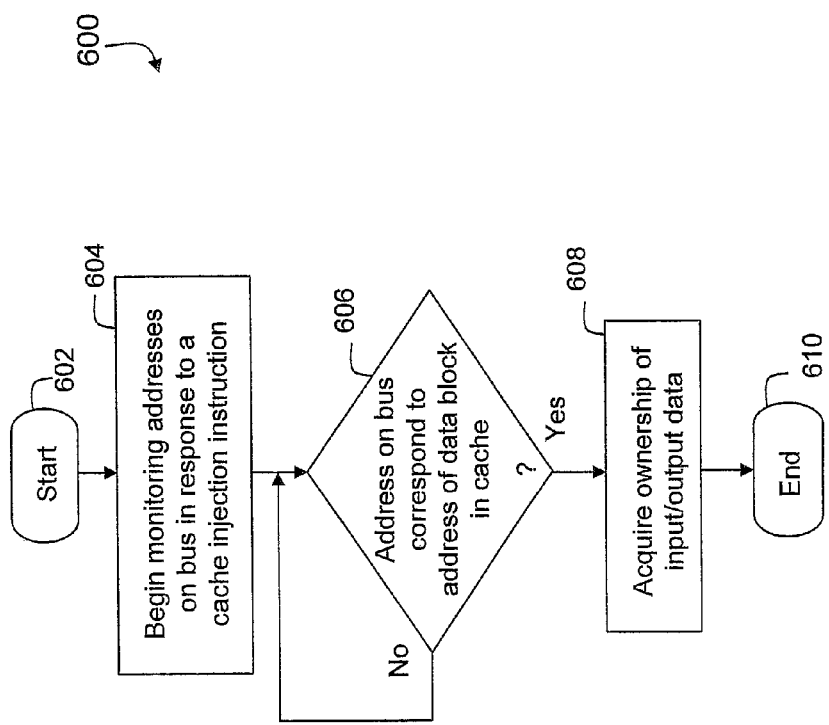
FIG. 6 is a flowchart of an example process for performing cache injection, according to yet another aspect of the present disclosure.

With reference to FIG. 6, a flowchart of an example process 600 for performing cache injection according to another aspect of the present disclosure is illustrated. In block 602 the process 600 is initiated, at which point control transfers to block 604. In block 604, a cache controller (e.g., an L1 cache controller) begins monitoring (snooping) addresses on a bus (e.g., a memory bus including multiple address, data, and control lines) in response to having one or more 'g' state data blocks as dictated by one or more cache injection instructions. Next, in decision block 606, the cache controller determines whether an address on the bus corresponds to an address of a data block that is in a 'g' state. That is, the cache controller determines whether an associated cache directory includes a 'g' state data block whose address corresponds to the address on the bus (i.e., whether a cache-hit occurs). The address on the bus may, for example, correspond to an address for a DMA write to main memory. If an address on the bus does not correspond to a 'g' state address in the cache, control loops on block 606. If an address on the bus corresponds to a 'g' state address in the cache, control transfers to block 608.

In block 608, the cache controller acquires ownership of the I/O data. In acquiring ownership of the I/O data, the cache controller causes the I/O data to be stored in a data block of the cache that is associated with the address. In a typical implementation, the cache controller also exercises one or more control lines to acknowledge receipt of the I/O data and indicate to a main memory controller that storage of the I/O data in the main memory is not required (effectively stopping the DMA write to main memory). Following block 608, control transfers to block 610 where the process 600 terminates.

According to another aspect of the present disclosure, monitoring hardware is implemented (e.g., within a load store unit (LSU) of a processor) to spawn a grab coherency state. In this case, the hardware monitors (snoops) an instruction stream for a specified instruction sequence and spawns the 'g' state (for an associated address in a cache) in response to encountering the specified instruction sequence for a given number of times. For example, a 'g' state may be spawned when the hardware detects fifty iterations of a loop including a load (LD), compare (CMP), branch conditional (BC) instruction sequence (which, in this example, corresponds to processor polling for I/O data), where the LD instruction goes to the same address. In this case, when a DMA write to an address associated with the LD instruction is encountered, a data block (including I/O data) at the address is stored in an associated cache (instead of main memory). In at least one embodiment, the hardware is also configured to put one or more threads associated with the instruction sequence loop to sleep (facilitating assignment of one or more other threads to an associated processor) until the I/O data is received. Upon receipt of the I/O data, a context switch may be initiated such that the one or more threads that were put to sleep are woken-up to process the I/O data. In another embodiment (e.g., when simultaneous multithreading is employed), the hardware is also configured to place one or more threads associated with the instruction sequence loop in a low priority state (facilitating assignment of one or more other threads to an associated processor) until the I/O data is received. Placing the one or more threads in a low priority state may facilitate power reduction and allows freed cycles to be assigned to other active threads. In this case, instructions associated with a low priority thread may be periodically issued every two-hundred fifty-six cycles, every one-thousand twenty-four cycles, etc.

Figure 7:
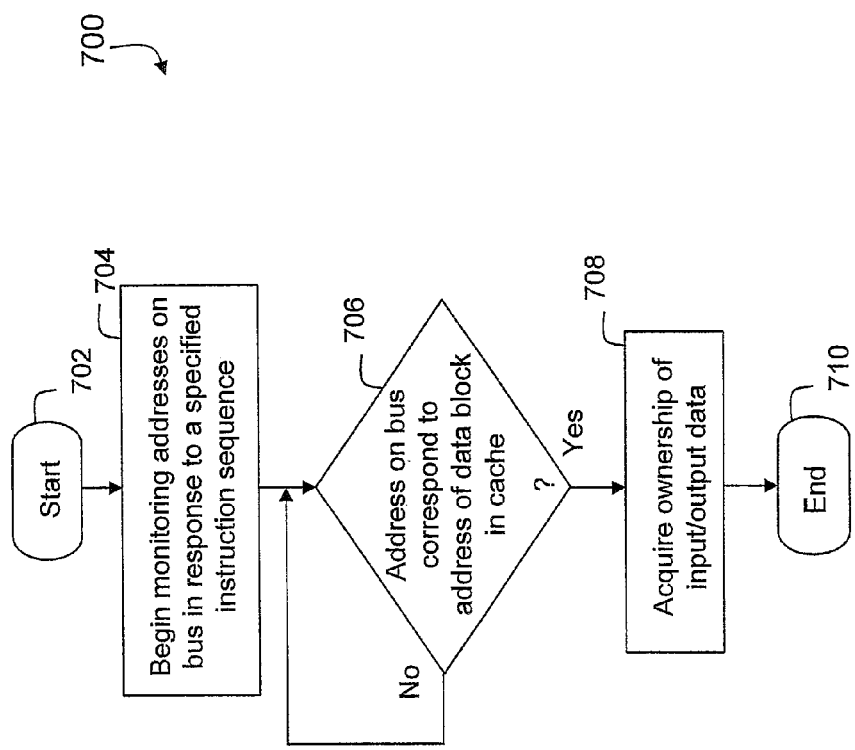
FIG. 7 is a flowchart of an example process for performing cache injection, according to a different aspect of the present disclosure.

With reference to FIG. 7, a flowchart of an example process 700 for performing cache injection according to another embodiment of the present disclosure is illustrated. In block 702 the process 700 is initiated, at which point control transfers to block 704. The process 700 is similar to the process 600, with the exception that monitoring hardware (as contrasted with a cache injection instruction) spawns a 'g' state for a data block in a cache in response to a specified instruction sequence. In block 704, a cache controller (e.g., an L1 cache controller) begins monitoring (snooping) addresses on a bus (in response to the monitoring hardware). Next, in decision block 706, the cache controller determines whether an address on the bus corresponds to an address of a data block that is in a 'g' state. In this case, the cache controller determines whether an associated cache directory includes a 'g' state data block (cache line) whose address corresponds to the address on the bus (i.e., whether a cache-hit occurs). If an address on the bus does not correspond to a 'g' state address in the cache, control loops on block 706. If an address on the bus corresponds to a 'g' state address in the cache, control transfers to block 708.

In block 708, the cache controller acquires ownership of the I/O data. In acquiring ownership of the I/O data, the cache controller causes the I/O data to be stored in a data block of the cache that is associated with the address. In a typical implementation, the cache controller also exercises one or more control lines to acknowledge receipt of the I/O data and indicate to a main memory controller that storage of the I/O data in the main memory is not required (effectively stopping the DMA write to main memory). Following block 708, control transfers to block 710 where the process 700 terminates.

According to a different aspect of the present disclosure, a data block at an address associated with a DMA access (associated with I/O data) is written to a cache that includes a data block at the address. In this case, a replacement policy position may be modified in an attempt to ensure that the data block is not evicted from the cache prior to use. For example, a replacement policy position of the data block in an L1 cache may be modified from a least recently used (LRU) position to a most recently used (MRU)-1 position.

Figure 8:
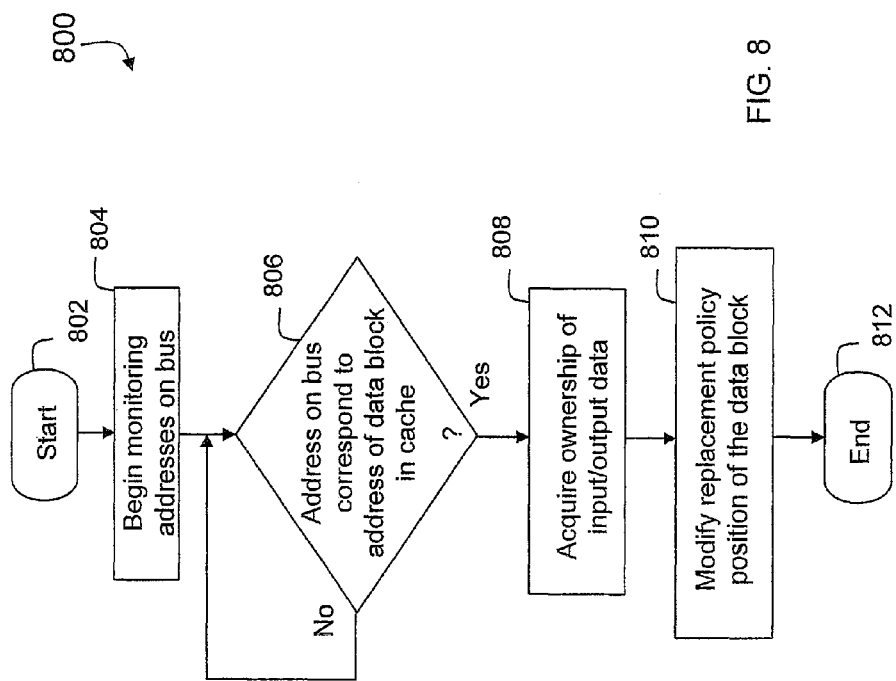
FIG. 8 is a flowchart of an example process for performing cache injection, according to still another aspect of the present disclosure.

With reference to FIG. 8, a flowchart of an example process 800 for performing cache injection according to another aspect of the present disclosure is illustrated. In block 802 the process 800 is initiated, at which point control transfers to block 804. In block 804, a cache controller begins monitoring (snooping) addresses on a bus in response to one or more associated data blocks being in a 'g' state. Next, in decision block 806, the cache controller determines whether an address on the bus corresponds to an address of a data block that is in the 'g' state. That is, the cache controller determines whether an associated cache directory includes a 'g' state data block whose address corresponds to the address on the bus (i.e., whether a cache-hit occurs). As noted above, the address on the bus may, for example, correspond to an address for a DMA write to main memory. If an address on the bus does not correspond to a 'g' state address in the cache, control loops on block 806. If an address on the bus corresponds to a 'g' state address in the cache, control transfers to block 808.

In block 808, the cache controller acquires ownership of the I/O data. In acquiring ownership of the I/O data, the cache controller causes the I/O data to be stored in a data block of the cache that is associated with the address. In a typical implementation, the cache controller also exercises one or more control lines to acknowledge receipt of the I/O data and indicate to a main memory controller that storage of the I/O data in the main memory is not required (effectively stopping the DMA write to main memory). Next, in block 810 a replacement policy position of the data block is modified in an attempt to ensure that the I/O data is consumed before being ejected from the cache. For example, a replacement policy position may be changed from an LRU-1 position to a MRU-1 position. Following block 810, control transfers to block 812 where the process 800 terminates.

Accordingly, a number of techniques have been disclosed herein that readily facilitate implementation of cache injection in a processor that includes, for example, one or more in-order or out-of-order processor cores.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," (and similar terms, such as includes, including, has, having, etc.) are open-ended when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of performing cache injection, comprising:
   executing a cache injection instruction, wherein the cache injection instruction has an associated address and the cache injection instruction indicates that cache injection is to be employed to provide input/output data to a data block of a cache at the associated address;
   monitoring, by the cache, addresses on a bus in response to the execution of the cache injection instruction; and
   acquiring, at the cache, ownership of input/output data on the bus when an address on the bus, that is associated with the input/output data, corresponds to the associated address of the data block stored in the cache.

2. The method of claim 1, wherein the acquiring, at a cache, ownership further comprises:
   storing the input/output data associated with the address on the bus in the cache at the address; and
   acknowledging receipt of the input/output data.

3. The method of claim 1, wherein the input/output data is associated with a direct memory access (DMA) write to main memory.

4. The method of claim 1, wherein the bus includes multiple address, data, and control lines.

5. A method of performing cache injection, comprising:
   executing a cache injection instruction, wherein the cache injection instruction has an associated address and the cache injection instruction indicates that cache injection is to be employed to provide input/output data to respective data blocks of a first cache and a second cache at the associated address;
   monitoring, at the first cache, addresses on a bus in response to the execution of the cache injection instruction;
   monitoring, at the second cache, the addresses on the bus in response to the execution of the cache injection instruction; and
   acquiring, based on an implemented priority scheme, ownership of input/output data on the bus at one of the first or second caches when an address on the bus, that is associated with the input/output data, corresponds to the associated address of the respective data blocks stored in the first and second caches.

6. The method of claim 5, wherein the acquiring, at one of the first or second caches, ownership further comprises:
   selecting, based on the implemented priority scheme, one of the first and second caches to acquire ownership of the input/output data;
   storing the input/output data associated with the address on the bus in the selected one of the first and second caches at the address; and
   acknowledging receipt of the input/output data.

7. The method of claim 5, wherein the input/output data is associated with a direct memory access (DMA) write to main memory.

8. The method of claim 5, wherein the bus includes multiple address, data, and control lines.

9. The method of claim 5, wherein the implemented priority scheme is based on which of the data blocks in the first or second caches has a higher replacement policy position.

10. The method of claim 5, wherein the implemented priority scheme is based on which of the first or second caches transitioned to a grab coherency state later in time.

11. The method of claim 5, wherein the first and second caches correspond to L1, L2, or L3 caches.

12. The method of claim 5, further comprising:
modifying a replacement policy position of one of the respective data blocks that is associated with whichever of the first or second caches that assumes ownership of the input/output data.

13. The method of claim 12, wherein the replacement policy position is increased to a higher replacement policy position.

14. A cache system, comprising:
a first cache configured to monitor addresses on a bus in response to execution of a cache injection instruction, wherein the cache injection instruction has an associated address and the cache injection instruction indicates that cache injection is to be employed to provide input/output data to a data block of the first cache at the associated address; and
a second cache configured to monitor the addresses on the bus in response to execution of the cache injection instruction, wherein the cache injection instruction also indicates that cache injection is to be employed to provide input/output data to a data block of the second cache at the associated address, and wherein one of the first and second caches is configured to acquire, based on an implemented priority scheme, ownership of input/output data on the bus when an address on the bus, that is associated with the input/output data, corresponds to the associated address of the respective data blocks stored in the first and second caches.

15. The cache system of claim 14, wherein the first and second caches are further configured to:
select, based on the implemented priority scheme, one of the first and second caches to acquire ownership of the input/output data;
store the input/output data associated with the address on the bus in the selected one of the first and second caches at the address; and
acknowledge receipt of the input/output data.

16. The cache system of claim 15, wherein the input/output data is associated with a direct memory access (DMA) write to main memory.

17. The cache system of claim 16, wherein the bus includes multiple address, data, and control lines.

18. The cache system of claim 17, wherein the implemented priority scheme is based on which of the data blocks in the first or second caches has a higher replacement policy position.

19. The cache system of claim 16, wherein the implemented priority scheme is based on which of the first or second caches transitioned to a grab coherency state later in time.

20. The cache system of claim 19, wherein the first and second caches correspond to L1, L2, or L3 caches.

* * * * *